US006453460B1

(12) United States Patent
Keyes

(10) Patent No.: US 6,453,460 B1
(45) Date of Patent: Sep. 17, 2002

(54) COMPUTER SYSTEM WITH SINGLE PROCESSING ENVIRONMENT FOR EXECUTING MULTIPLE APPLICATION PROGRAMS

(75) Inventor: Charles K. Keyes, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/299,947

(22) Filed: Apr. 26, 1999

(51) Int. Cl.[7] .................................................. G06F 9/44
(52) U.S. Cl. ......................................... 717/108; 709/310
(58) Field of Search ........................... 711/162; 709/243, 709/315, 1, 106, 107, 310, 312; 717/11, 1, 2, 3, 108, 116, 162, 163, 164, 165, 167; 707/103

(56) References Cited

U.S. PATENT DOCUMENTS

| | | | | |
|---|---|---|---|---|
| 5,297,284 A | * | 3/1994 | Jones et al. ...................... 717/5 |
| 5,509,123 A | * | 4/1996 | Dobbins et al. ............. 709/243 |
| 5,765,157 A | | 6/1998 | Lindholm | |
| 5,794,038 A | * | 8/1998 | Stutz et al. .................. 709/315 |
| 5,822,580 A | * | 10/1998 | Leung ......................... 707/103 |
| 5,829,045 A | * | 10/1998 | Motoyama .................. 711/162 |
| 5,864,862 A | | 1/1999 | Kriens | |
| 5,864,866 A | | 1/1999 | Henckel | |
| 5,920,725 A | * | 7/1999 | Ma et al. ....................... 717/11 |

OTHER PUBLICATIONS

Programming Distributed Collaboration Interaction Through the World Wide Web, © Roberto Augusto Flores–Méndez 1997 A Thesis Submitted to the Faculty of Graduate Studies in Partial Fulfillment of the Requirements for the Degree of Master of Science.*

* cited by examiner

Primary Examiner—Kakali Chaki

(57) ABSTRACT

A computer system according to various aspects of the present invention includes an environment having a single processing space, i.e. not designed for multiprocessing with a process switch. In such an environment, multiple application programs may refer to common library program specifications without conflict. For example, when a first application program requires instantiation of a library object, the library object is instantiated by a factory object of the library. Instance variables of a singleton factory object for each application program provide shared data between library objects. A method of integrating program specifications may include revising library classes to include a factory class, restating static class variables as factory instance variables, and recompiling the library to replace all references to static class variables with references to the factory instance variables. Multiple application programs, perhaps developed independently, may then be executed in a single processing environment such as a JAVA virtual machine designed for a single application program.

20 Claims, 6 Drawing Sheets

COMPUTER SYSTEM WITH SINGLE PROCESSING ENVIRONMENT FOR EXECUTING MULTIPLE APPLICATION PROGRAMS

FIELD OF THE INVENTION

Embodiments of the present invention relate to methods of developing object oriented programs and to systems that execute object oriented programs.

BACKGROUND OF THE INVENTION

An object oriented program is a computer program that has been written in a computer programming language having semantics for describing software components designed to cooperate by passing messages between them. Such a computer program defines the overall program behavior as a combination of the behavior of so-called "objects". An object is an association of data structure and behavior. An object oriented program may employ multi-tasking program behavior.

Although the computer that performs an object oriented program may have only one central processing unit for the execution of only one instruction at a time, some of the instructions of each object may be executed in turn in slices according to known techniques of time sharing.

An object oriented program may appear to be responsive to a wider range of inputs than a conventional non-object oriented program for providing the same overall behavior. Programmers have found that for complex behavior, a program developed using object oriented programming techniques is more likely to provide correct behavior in response to a particular sequence of inputs from a wide range of inputs too numerous to test in all combinations.

The semantics of an object oriented programming language permit the description of a program having multiple objects, each operating with its own values. For example, a display of multiple circles being continuously and seemingly simultaneously redrawn at random times with random positions and sizes may be defined by an object oriented program with multiple objects, each object having the function to draw one circle, and each operating with exclusive access to its own variables. As seen by the central processing unit (CPU), the behavior of an object is expressed as a sequence of instructions in the executable instruction code appropriate for the CPU fetched from specific addresses in memory. Such instructions cause the CPU to read and modify the values of numerous variables at specific addresses in the memory. To achieve seemingly simultaneous redrawing of circles, execution of each object is restricted to a time slice. Because a time slice may lapse at any moment during the sequence being performed by one of the circle drawing objects, data describing the position in the instruction sequence (a thread) must be saved and later referred to by the CPU to continue a particular circle when that particular object is given another time slice.

Each object has behavior and state. The functions (i.e., operations or services) of an object are called its behavior. The data describing values of variables and the data describing the position in the instruction sequence are collectively called the object's state. An object oriented program defines in a program specification the behavior of each unique object and the variables needed for its functions. This definition is, in some programming languages, called a class from which one or more instances of the object may be set in motion (e.g., instantiated).

Complex programs are typically written in modules, sometimes called packages. The definition given by the programmer in all of the modules taken together is compiled one module at a time and then the results of compilation are linked to form executable code with specific references to memory addresses. Linking may be delayed to a time just before the objects of a particular module are needed.

In operation, memory is allocated for the state of each instance of each object. Continuing with the display example above, because all of the circle drawing objects have the same behavior, the memory may contain, at a particular time, one copy of the circle drawing behavior (e.g., instruction code for a method specification of a class) used by all of the circle drawing objects; and, one copy of the circle drawing state (e.g., defined by prototype in the class) for each instance of a circle drawing object.

When teams of programmers develop, over a period of years, products that include computer programs, it is desirable to include in a next product the tested behaviors of some of the previously developed objects. However, such objects may include functions that have not been independently defined, for example, because sharing of data between functions was implemented with references to one or more variables outside the objects' state. Without a simple method for establishing independence between modules, costly rewriting of each behavior of each module to be included in the next product may be unavoidable. The time and expense of such an undertaking may prevent some products from being brought to market. Consequently, the extent and pace of competition are constrained and benefits to society do not materialize.

SUMMARY OF THE INVENTION

A memory, according to various aspects of the present invention, has indicia of an object oriented program that in operation provides indicia of a state. The state includes two instances of a factory and two instances of an object. The first instance of the factory includes a first instance variable. The second instance of the factory includes a second instance variable. The first instance variable is responsive to either the instantiation of the first object by the factory or responsive to an operation of the first object. The second instance variable is responsive to either the instantiation of the second object by the second factory or responsive to an operation of the second object. The first instance variable is independent of both the instantiation of the second object and the operation of the second object.

When, for example, the first and second instance variables of the respective factories respond to the instantiation of the first and second objects, each factory consequently maintains a count of the number of objects it has instantiated. Each object may read the respective number of instances that applies to its factory. By implementing a count of instances as an instance variable of a respective factory, as opposed to a static variable of the object's class, the first and the second object may execute independently of each other. As another example, when the execution environment includes a JAVA virtual machine (JVM) that supports a single processing space, independent execution as described above permits multiple application programs to be concurrently executed by the JVM.

A printer, according to various aspects of the present invention, includes a print engine, a processor, and a memory. The processor provides data to the print engine. The memory has indicia of an object oriented program executed by the processor to provide indicia of a state as discussed above. When, for example, the first and second instance variables of the respective factories respond respectively to operations of the objects, each object may use its factory's instance variable independently of the operations of the other object. As another example, when the execution environment includes a JAVA virtual machine (JVM) that supports a single processing space, independent execution as described above permits multiple application programs to independently use the behavior of the same library object with independent states.

A method, according to various aspects of the present invention, for integrating a first program specification with application program specifications includes two steps performed in any order. The first specification includes references to static data. The resulting integration is operative in an environment, for example a JVM as discussed above. In one of the steps, a revised first specification is prepared wherein the revised first specification includes a factory specification; the factory is specified to perform object instantiation in accordance with the revised first specification; and the factory specification defines factory instance data. In the other step, a first reference to the static data is replaced with a second reference to the factory instance data; and, each application specification is prepared so that a factory object instantiated in accordance with the factory specification responds to each request for instantiation of a respective object of the first revised specification.

The revision to the first specification and the criteria for revising (or initially writing) application specifications provides for concurrent application execution in a manner that is considerably simpler than, for example, modifying the execution environment to permit multiple separate processing spaces. The capability to perform multiple application programs is supported with no change to the processing environment. For example, when applied to the specifications of object oriented programs to be executed by a JVM as discussed above, the resulting integration will operate on one unmodified JVM intended for single process execution. The expense of providing a JVM for each application specification may be avoided.

BRIEF DESCRIPTION OF THE DRAWING

Embodiments of the present invention will now be further described with reference to the drawing, wherein like designations denote like elements, and.

DETAILED DESCRIPTION OF PREFERRED EMBODIMENTS

A computer system, according to various aspects of the present invention, obtains independent operation of multiple application programs in a single processing space. Such a computer system includes any conventional circuitry or network of equipment that provides an object oriented program execution environment. Automated equipment (e.g., a printer) may be part of such a computer system and may internally incorporate such a computer system.

Figure 1:
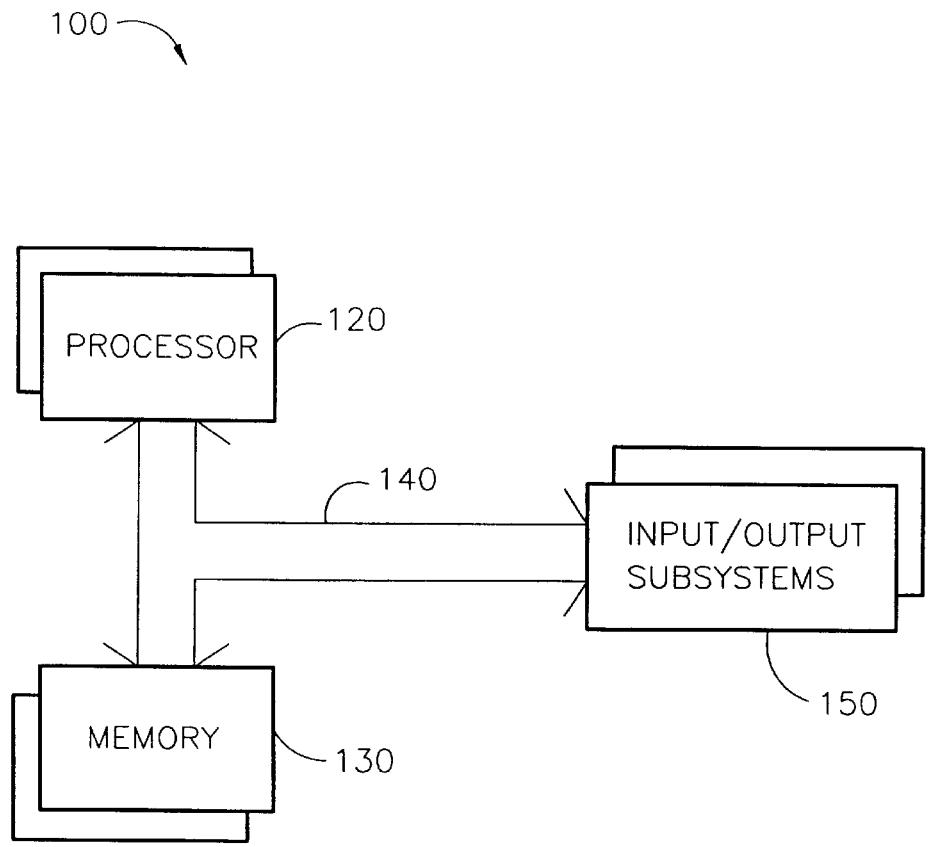
FIG. 1 is a functional block diagram of a computer system according to various aspects of the present invention.
Figure 2:
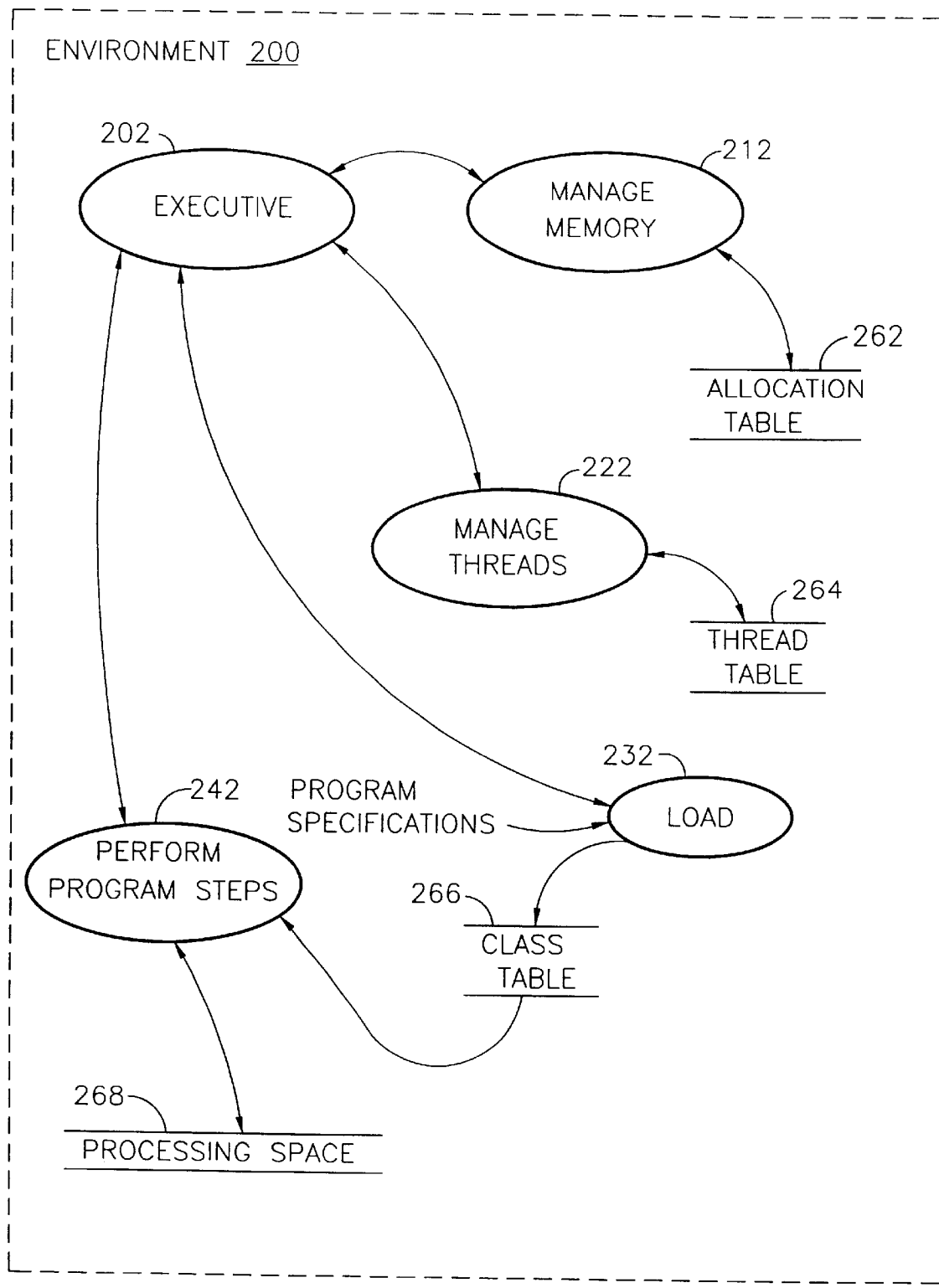
FIG. 2 is a data flow diagram of a computing environment provided by the computer system of FIG. 1.
Figure 3:
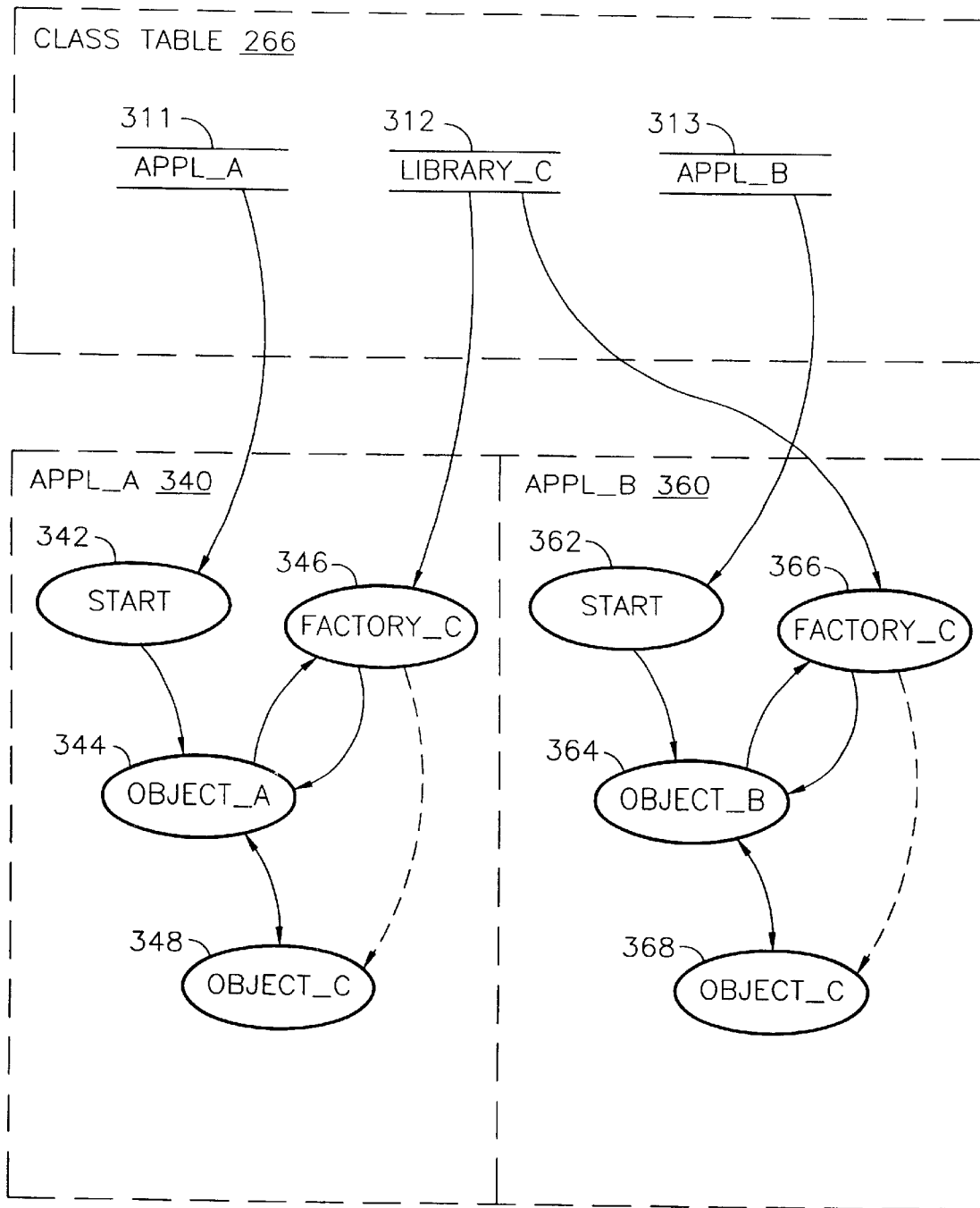
FIG. 3 is a data flow diagram of two application programs operating in the environment of FIG. 2.
Figure 5:
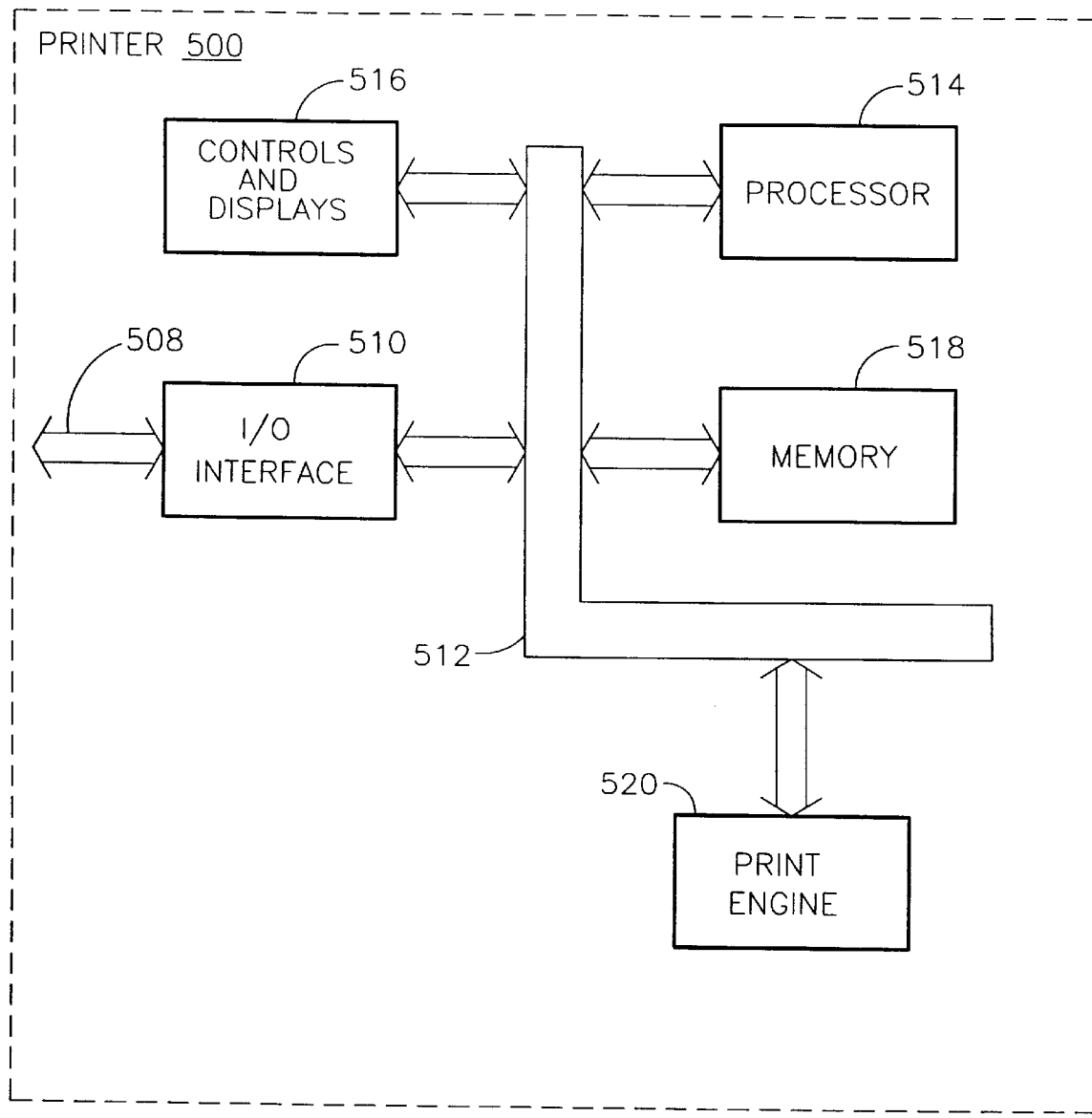
FIG. 5 is a functional block diagram of a printer in one embodiment of the present invention.

Generally, an execution environment is provided by a conventional operating system. For executing platform independent, object oriented programs, the processing environment may be provided by a conventional virtual machine or interpreter (e.g., a JAVA Virtual Machine, JAVA being a trademark of Sun Microsystems Inc.). For example, a computer system 100 as in FIG. 1 or a printer 500 as in FIG. 5 may each provide an execution environment 200 as in FIG. 2. A computer system 100 may include any number of processors 120, any number of memories 130, and any number of input/output subsystems 150 coupled together for data transfer and control by bus 140.

Memory, according to various aspects of the present invention, includes indicia of multiple program specifications and, in operation, includes data structures for recording the state of objects instantiated from the program specifications. For example, specifications in some programming languages are called "Classes" and may be arranged in one or more data structures to exhibit hierarchical relationships between program specifications. Physically, memory 130, 518 may include any combination of conventional data storage and retrieval devices, including, for example, disk memory or semiconductor memory. Memory may be integrated with one or more processors on a single substrate, or may be packaged as a circuit module for convenient storage of information, handling, and incorporation into computer systems and/or automated equipment. For example, a JVM may be provided in one or more physically separate packages (e.g., integrated circuit substrates), chip set(s), or module(s)) and application programs to be executed by the JVM may be provided in the same or other packages. Different organizations may contribute package(s) for incorporation into computer system 100 or printer 500 by the original equipment manufacturer or by a technician or user in the field.

As discussed above, an object oriented execution environment may be provided by one or more processors coupled to memory in one or more packages. In operation, such an environment controls the performance of program steps and supports program steps that call for dynamic loading of program specifications in addition to the program specification that is currently being performed, dynamic allocation of additional memory, and may support execution of more than one thread of program execution. For example, environment 200 includes five cooperating processes: executive process 202, memory managing process 212, thread managing process 222, loading process 232, and program step performing process 242.

An executive process includes any process responsible for platform specific behaviors including power-on initialization, device, bus, and memory circuit control, device related error conditions, and power-off procedures. For example, executive 202 includes all procedures necessary for preparing for execution and executing a conventional program specification of an object oriented program.

A memory managing process includes any process responsible for allocating memory, freeing allocated memory, and garbage collection. Allocation generally includes identifying a particular address range of memory to a storage declaration in a program specification. Memory may be allocated for storage of program specifications, shared (static) variables, and/or the state of an object. Instantiation of an object generally includes allocation of memory sufficient for a data structure describing the state of the object and may include dynamically bound links to instructions for the object's behaviors. The data structure for object state is typically described in the respective program specification.

A thread managing process includes any process responsible for conducting execution of one or more streams of execution. Portions of a program specification suitable for multithreading are necessarily designed to be reentrant. To be reentrant, inter alia, an object generally cannot refer to information that is not included in the data structure for storing that object's state. This condition is generally not satisfied when an object refers to shared (static) variables. Multithreading differs from multiprocessing in that in multiprocessing the same memory addresses are generally used by more than one application program; therefore, during a process switch, a copy of memory is typically stored elsewhere or a change is made in memory addressing. A process switch is not performed (and so may be omitted from the system design) when a processor uses a single processing space. In multithreading, the objects being executed in different threads do not store respective state information at the same addresses; therefore, a single processing space may be used by all objects of all threads.

For example, thread managing process 222, records thread status for all active threads in thread table 264, arranged in any conventional manner. When a thread switch is demanded by executive 202, thread managing process 222 swaps processor state information (e.g., internal register contents) with reference to thread table 264 and suitably transfers control to the next thread. Thread managing process 222 may include any conventional thread priority determination and scheduling procedures.

A loading process includes any process responsible for copying into a processor's executable memory space at least part of a program specification and making the loaded information available for reference or performance by a program performing process. For example, when executable memory space is limited, a first part of an application program specification may be initially loaded (or resident) for beginning application program execution. Reference to another nonloaded portion of the application program specification may invoke a transfer of control from the program performing process to a loading process to allocate memory for additional program specification information, copying into the allocated memory a suitable program specification (in part or in full) and dynamically binding (also called late binding or late linking) the loaded information for subsequent execution. For example, loading process 232 cooperates with executive 202 and memory managing process 212 to allocate memory, cooperates with executive 202 to obtain classes from secondary storage (e.g., page memory or disk storage), and performs dynamic binding to incorporate the loaded classes into the class hierarchy suitably stored in class table 266. Loaded classes may be stored in a subtree of the class hierarchy. Subtrees may be employed for orderly reference to names, for example, permitting unambiguous reference to each name of duplicate names in the hierarchy. Loading process 232 may, as a preliminary step, store portions of class table 266 in secondary storage to free memory for subsequent allocation.

A class table includes any data structure suitable for storing program specification information. For example, class table 266 includes one or more data structures for maintaining a single class hierarchy as typically used in a JVM. Such a class hierarchy may have subtrees as discussed above.

A program step performing process includes any process that executes or interprets a program specification to carry out operations (or services) of an object. Each object's state (as modified during execution of the respective program specification) is stored in a respective data structure in a processing space. When an object is instantiated more than once (e.g., for recursion or multiple threads), a copy of the data structure for storing the object's state will be maintained in the processing space for exclusive reference by each object instance. For example, program step performing process 242 cooperates with thread managing process 222 to obtain processing state information that identifies a next step to execute for the currently active thread. Then, program step performing process performs the identified step(s) with consequent changes to instance variables of affected objects' states and to shared (static) variables outside these states. When a stream of execution suspends or ends, program step performing process 242 suitably informs executive 202 and thread managing process 222 for an appropriate action or error message. Execution may be suspended until loading process 232 completes dynamic binding of further steps to be executed.

Figure 4:
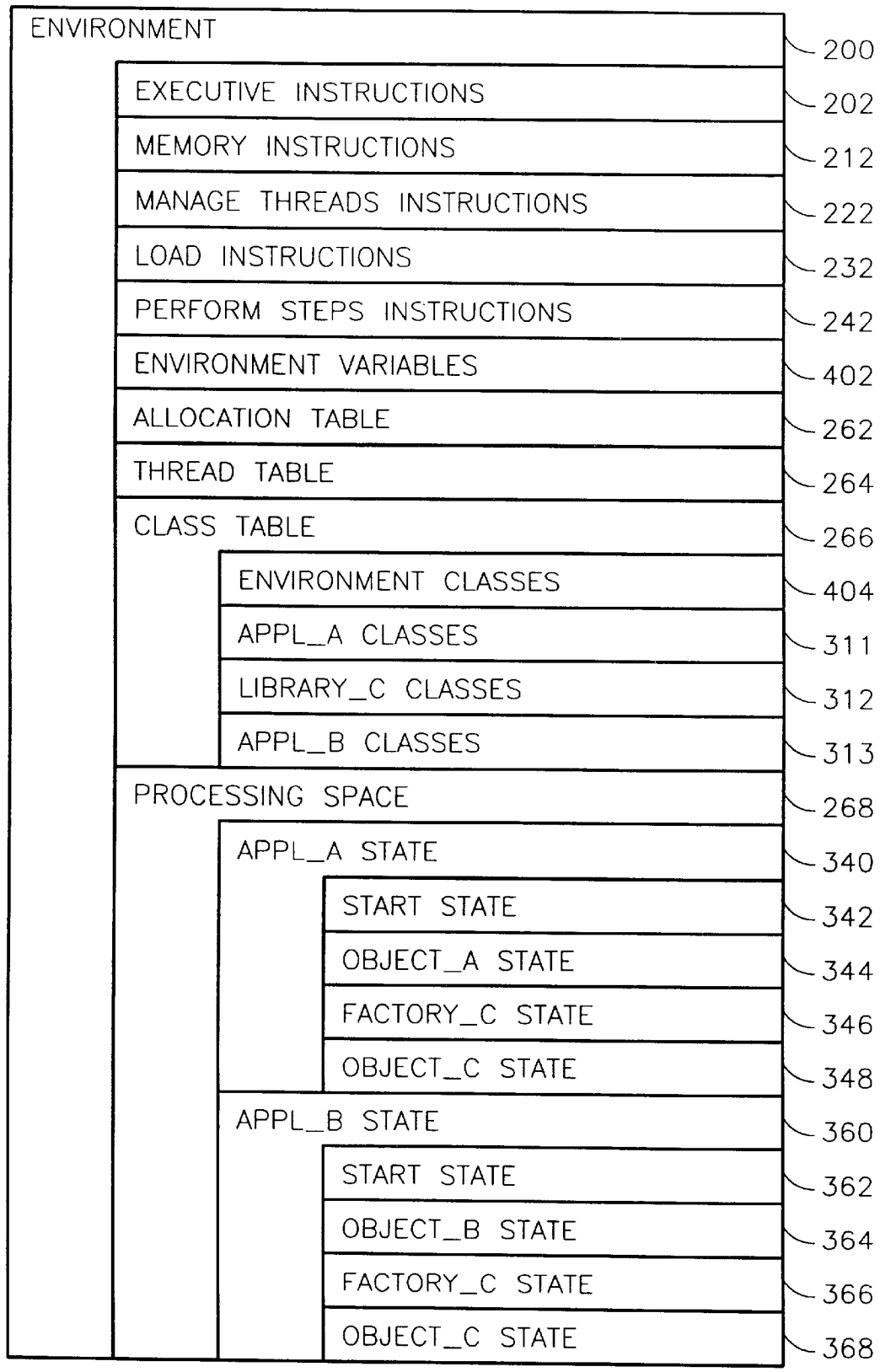
FIG. 4 is a memory map of the contents of memory during operation of the two application programs shown in FIG. 2.

Obtaining independence between application programs in a single processing space is accomplished, according to various aspects of the present invention, in part by indirect instantiation of each commonly used reentrant object. Indirect instantiation may be better understood from an example of a sequence of actions performed by computer system 100 as illustrated in FIGS. 1 through 4 and Table 1. In Table 1, executive process 202 loads and begins execution of a first application program APPL_A 340 and then loads and begins execution of a second application program APPL_B 360. Execution begins with an object having a predetermined name, e.g., START, which in other programming languages may be MAIN or an equivalent. Each application program instantiates its unique objects identified as OBJECT_A and OBJECT_B for convenience of illustration. Each application then makes reference to a program specification LIBRARY_C for services provided by an object named FACTORY_C and one or more objects denoted OBJECT_C. In this example, all instances of FACTORY_C and OBJECT_C derive from the same program specification, though behavior may vary according to separately maintained states 346, 348, 366, and 368 as illustrated in FIG. 4.

TABLE 1

| EXECUTIVE | APPL_A | APPL_B |
|---|---|---|
| Initialize environment 200 | | |
| Load APPL_A 340 | | |
| | Instantiate START object 342 from class 311 in first thread and activate first thread | |
| | | Check availability of LIBRARY_C, call executive to load LIBRARY_C 312 |
| Load LIBRARY_C 312 | | Instantiate FACTORY_C 346 from class 312 (other factories' may also be instantiated now or as needed) |
| Load APPL_B 360 | | Instantiate OBJECT_A 344 from class 311 |
| | Instantiate START object 362 from class 313 in second thread and activate second thread | indirectly instantiate one or more OBJECT_C 348 from class 312 via FACTORY_C 346 |

TABLE 1-continued

| EXECUTIVE | APPL_A | APPL_B |
|---|---|---|
| perform further executive functions as needed including garbage collection, | Every instance of OBJECT_C 348 refers to factory instance variables 346 | Check availability of LIBRARY_C 312, no need to load it |
| | | Instantiate FACTORY_C 366 from class 312 (other singleton factory objects may also be instantiated now or as needed) Instantiate OBJECT_B 364 from class 313 indirectly instantiate one or more OBJECT_C 368 from class 312 via FACTORY_C 366 Every instance of OBJECT_C 368 refers to factory instance variables |

During initialization, environment 200 is established in memory 130. At this time, memory 130 includes a description of environment 200, as illustrated by portions of FIG. 4, which includes instructions for executive process 202, instructions for memory managing process 212, instructions for thread managing process 222, instructions for load process 232, instructions for program step performing process 242, environment variables 402, allocation table 262, a minimal thread table 264, a minimal class table 266, and a minimal processing space 268. Some of these items are minimal because, just after initialization, executive process 202 has not yet loaded any program specifications for operation. For example, class table 266 may include environment classes 404 as an application program interface (API) for use by application programs.

Note that the relevant contents of memory 130 are described logically in FIG. 4 without reference to physical aspects of memory addresses. The logical layout is convenient for illustration. A physical memory map of the functions of various address ranges indeed may have any intermixed configuration convenient for processing. For example, compiled and linked code blocks for the instructions 202, 212, 222, 232, and 242 may result in any arrangement of fragmented address ranges; and, the allocation of ranges of addresses for variables 402, tables 262, 264, 266, and processing space 268 may also result in any arrangement of fragmented address ranges. Memory 130 may support any function (instruction block, table, etc.) with multiple physically discontiguous ranges. As memory is allocated for additional environment variables, additions to tables, and additions to processing space, for example, further fragmentation may result without departing from the logical description illustrated in FIG. 4 or the various functional aspects of the present invention. Further, any physical layout of the contents of memory 130 may include the effects of access limitations as in segmented memory, extended memory, expanded memory, demand paging from disk memory, swap tables, shared memory for parallel processors, caches, etc.

After initialization, execution of APPL_A and APPL_B may proceed concurrently (e.g., multitasking by a single processor) with actions by executive process 202 as described above. Loading of APPL A results in the addition of APPL_A classes 311 to class table 266 and the allocation of processing space for APPL_A state 340 in processing space 268 as illustrated in FIG. 4. At any time after APPL_A is loaded, executive process 202 loads APPL_B 360. Loading of APPL_B results in the addition of APPL_B classes 313 to class table 266 and the allocation of processing space for APPL_B state 360 in processing space 268. When APPL_A and APPL_B are independently developed, APPL_A classes will be exclusively used by APPL_A and vice versa. Conflicts among commonly used identifiers (e.g., caused by duplicates in class table 266) may be avoided by any conventional technique such as a unique identifier prefix.

Indirect instantiation is illustrated as follows. OBJECT_C state 348 is allocated as a result of indirect instantiation. OBJECT_A 344 obtains a reference to a new instance of OBJECT_C, according to various aspects of the present invention, by passing a message to FACTORY_C rather than to OBJECT_C directly.

FACTORY_C, in response to the message, creates an instance of OBJECT_C state 348 and returns a reference to that state to OBJECT_A 344.

A factory object includes any object whose behavior includes instantiation of another object of a predetermined type. A factory object may also include instance variables in its state. A factory object may be a singleton object in the context of an application program. By utilizing a singleton factory object with instance variables in its state, multiple library objects may refer to the factory's instance variables in a manner analogous to references to library static variables.

Although OBJECT_A could have been designed to directly instantiate OBJECT_C, the responsibility for instantiation is carried by FACTORY_C instead and direct instantiation of OBJECT_C is prohibited by design policy. In a like manner, each type of library object needed by APPL_A may be indirectly instantiated via the same or another singleton factory object for APPL_A.

In a method according to various aspects of the present invention, multiple application programs that would otherwise behave incorrectly due to nonindependent references to shared data may be executed in a single processing environment without conflict. Consider, for example, a first application program that draws circles at random positions and random sizes on a display. As each new circle is drawn, the average size of all circles is computed. Now consider that the display is to be managed in two portions; the first application program is to be responsible for the left half of the display and a second application program, identical to the first application program, is to be responsible for the right half of the display. Independent operation of each application program is to be provided from a single processing environment. Both application programs were originally written to use a common library for a circle drawing object. Unfortunately, the library program specification includes statements that declare several variables in common (static) storage. These variables include the current number of instantiated library objects, and the current total area of all graphics drawn by library objects. Without modification, the first and second application programs cannot operate independently without, inter alia, independent values of these variables. It is desirable to minimize changes to the application programs and the library to control costs.

Modification of the application and library program specifications in the example above may proceed according to a method of the present invention which includes, in any order, the following steps: (a) prepare a revised library program specification wherein (a.1) the revised library includes a program specification for a factory object with factory instance variables as described above; and (a.2) each reference to a variable in static storage is replaced with a respective reference to a factory instance variable; and (b) prepare each application specification so that a factory object is instantiated in accordance with the factory specification; each respective factory responding, in the context of the respective application program, to each request for instantiation of a library object.

This method, as applied to the circle drawing application program example, may be better understood as illustrated in Table 2. Table 2 compares relevant portions of JAVA program specifications for the library, and each application program before modification (dependent) and after modification (independent).

TABLE 2

| Example of Dependent Program Specifications | Corresponding Independent Program Specifications |
|---|---|
| Library | Library |
|  | class CFactory{<br>  private double totalCircles = 0;<br>  private double totalArea = 0;<br>  public double getTotalCircles( ) {return totalCircles;}<br>  public double getTotalArea( ) {return totalArea;}<br>  public CFactory( ) { }<br>  public Circle CConstruct(double R) {<br>    Circle c = new Circle(this, R);<br>    + + totalCircles;<br>    totalArea + = c.getArea( );<br>    return c;<br>  } |
| class Circle {<br>  private static double totalCircles = 0;<br>  private static double totalArea = 0;<br>  public static double getTotalCircles( )<br>    {return totalCircles;}<br>  public static double getTotalArea( )<br>    {return totalArea;}<br>  private double area;<br>  public Circle(double R) {<br>    area = 3.14 * R * R;<br>    + + totalCircles;<br>    totalArea + = area;<br>  }<br>  protected void finalize( ) throws<br>    Throwable {<br>    - - totalCircles;<br>    totalArea - = area;<br>  }<br>} | class Circle {<br><br><br><br><br><br>  public double getArea( ) {return area;}<br><br>  private double area;<br>  public Circle(CFactory F, double R) {<br>    area = 3.14 * R * R;<br><br><br>  }<br>  protected void finalize( ) throws<br>    Throwable {<br>    F.CDestruct(this);<br>  }<br>  public void CDestruct(Circle C) {<br>    - - totalCircles;<br>    totalArea - = C.getArea( );<br>  }<br>} |
| Application Program | Application Program |
| public static void main (String[ ] args) {<br>  public double r, Circle c;<br><br>  Random randomN = newRandom( );<br>  do {<br>    r = randomN.nextDouble;<br>    c = new Circle(r);<br>    System.out.println(<br>      Circle.getTotalArea( ) /<br>      Circle.getTotalCircles( ));<br>  } while (True);<br>} | public static void Start( ) {<br>  public double r, Circle c;<br>  CFactory factory = new CFactory( );<br>  Random randomN = new Random( );<br>  do {<br>    r = randomN.nextDouble;<br>    c = factory.CConstruct(r);<br>    System.out.println(<br>      factory.getTotalArea( ) /<br>      factory.getTotalCircles( ));<br>  } while(True);<br>} |

Automated rquipment, according to various aspects of the present invention, may include a computer system as described above. Some examples of such equipment include computers, computer peripherals, telecommunications equipment, process control equipment, and instrumentation. For example, printer 500 of FIG. 5 includes processor 514 and memory 518 coupled by bus 512 in a manner generally corresponding to processor 120, memory 130, and bus 140 of FIG. 1. Printer 500 also includes controls and displays 516, I/O interface 510, and print engine 520 each coupled to bus 512 and collectively generally corresponding to input/output subsystems 150.

Figure 6:
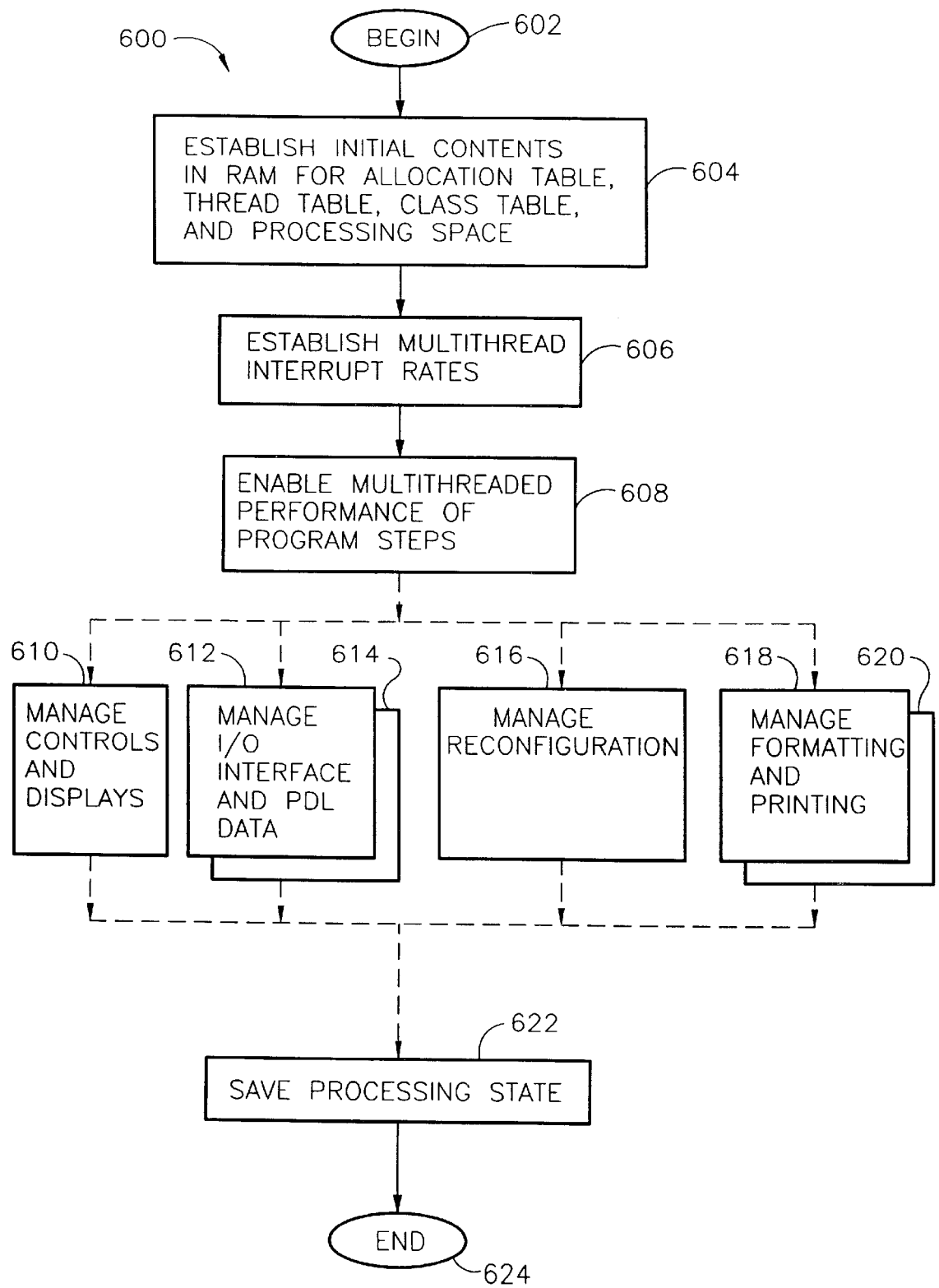
FIG. 6 is a method performed by the printer of FIG. 5.

Processor 514 and memory 518 cooperate to perform method 600 of FIG. 6 wherein an environment 200 is established at step 604 as described above. Multithreading is established at step 606 and enabled at step 608 for concurrent performance (e.g., via multitasking by a single processor) of steps 610 through 620 in four threads. When power is to be removed, control passes to step 622 where the state of all objects may be retained in a nonvolatile portion of memory 518.

The functions of printer 500 are extensible, according to various aspects of the present invention. For example, program specifications for step 612 may be supplemented and/or replaced by program specifications 614. Step 612 may include any conventional procedure for managing I/O interface 510 and managing data in a page description language (PDL). A PDL may include any protocol and/or format for defining an image to be printed, including a PDL of the type exemplified by Printer Control Language (PCL) marketed by Hewlett Packard Company or POSTSCRIPT language marketed by Adobe Systems, Inc. PCL and POSTSCRIPT are trademarks of the respective company. At step 612, PDL data as received over interface 508 may be used to provide supplemental or replacement data in the same PDL for printing in addition to or instead of PDL data as originally received.

As another example of extensibility, program specifications for step 618 may be supplemented, replaced, or overridden by program specifications 620. Step 618 may include any conventional procedure for managing formatting of data to be printed and/or managing printing by a particular print engine. Step 620 may provide support for improved image formatting techniques, emulation of alternate print engines, or accommodating a different print engine than supported by step 618.

Program specifications for steps 614 and/or 620 may be loaded into environment 200 of printer 500 in any manner including receipt via interface 508, transfer from secondary or paged portions to primary portions of memory 518, or by installation of additional memory 518 during manufacture or in the field as described above. When steps 610, 612, 616, and 618 constitute a first (e.g., standard, built-in, etc.) application program, step 614 may constitute a second application program and step 620 a third application program. According to various aspects of the present invention as described in general with reference to FIGS. 1 through 4, steps 612 and 614 may independently refer to a common library of objects (e.g., for fonts, line graphics, background images, PDL interpretation, etc.) and steps 618 and 620 may independently refer to the same or another common library of objects (e.g., for edge enhancement, color control, image processing, print engine control, etc.). For existing library and application program specifications, the modification of step 612 to accommodate step 614 and the modification of step 618 to accommodate step 620 may proceed according to various aspects of the methods described above.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. An object oriented program executed in an execution environment, the execution environment including a memory having indicia of the object oriented program and data structures for recording indicia of a state of objects instantiated during the object oriented program operation, the state comprising:

a. a first instance of a factory, the first instance comprising a first instance variable;

b. a second instance of the factory, the second instance comprising a second instance variable;

c. a first instance of an object, the first instance variable being responsive to a first operation of a first set consisting of forming the first instance of the object by the first instance of the factory and an operation of the object with the first instance of the object; and d. a second instance of the object, the second instance variable being responsive to a second operation of a second set consisting of forming the second instance of the object by the second instance of the factory and an operation of the object with the second instance of the object; wherein e. the first instance variable is independent of the second operation.

2. The object oriented program of claim 1 wherein the indicia of the object oriented program comprises indicia of a class hierarchy.

3. The object oriented program of claim 2 wherein the hierarchy comprises:

a. a first subtree comprising a first specification that, in operation, directs the first instance of the factory to form the first instance of the object; and b. a second subtree comprising a second specification that, in operation, directs the second instance of the factory to form the second instance of the object.

4. The object oriented program of claim 3 wherein the hierarchy further comprises a specification of the factory and a specification of the object.

5. The object oriented program of claim 1 wherein the memory further includes indicia of a virtual machine for performing the object oriented program.

6. The object oriented program of claim 1 wherein the indicia of the object oriented program comprises JAVA byte code.

7. A printer comprising:

a. a print engine;

b. a processor that provides data to the print engine; and c. a memory having indicia of an object oriented program and data structures for recording indicia of a state of objects, the object oriented program executed by the processor to provide indicia of the state, the state comprising:

(1) a first instance of a factory, the first instance comprising a first instance variable;

(2) a second instance of the factory, the second instance comprising a second instance variable;

(3) a first instance of an object, the first instance variable being responsive to a first operation of a first set consisting of forming the first instance of the object by the first instance of the factory and an operation of the object with the first instance of the object; and (4) a second instance of the object, the second instance variable being responsive to a second operation of a second set consisting of forming the second instance of the object by the second instance of the factory and an operation of the object with the second instance of the object; wherein (5) the first instance variable is independent of the second operation.

8. The printer of claim 7 wherein the indicia of the object oriented program comprises indicia of a class hierarchy.

9. The printer of claim 8 wherein the hierarchy comprises:
a. a first subtree comprising a first specification that, in operation, directs the first instance of the factory to form the first instance of the object; and
b. a second subtree comprising a second specification that, in operation, directs the second instance of the factory to form the second instance of the object.

10. The printer of claim 9 wherein the hierarchy further comprises a specification of the factory and a specification of the object.

11. The printer of claim 9 wherein the memory comprises two or more packages including:
a. a first package having indicia of the first specification; and
b. a second package having indicia of the second specification.

12. The printer of claim 9 wherein:
a. the first specification comprises:
(1) an interface controller for receiving first data in accordance with a page description language; and
(2) a formatter for controlling the print engine; and
b. a second specification comprises a modifier for providing second data in response to the first data, the second data being received from the interface controller, the second data being provided to the formatter in accordance with the page description language.

13. The printer of claim 9 wherein:
a. the first specification comprises a first formatter for controlling the print engine in a first operating mode, the first formatter for preparing first data for the print engine in accordance with a page description language; and
b. the second specification comprises a second formatter for controlling the print engine in a second operating mode, the second formatter for preparing second data for the print engine in accordance with the page description language.

14.(amended) The printer of claim 7 wherein the memory further includes indicia of a virtual machine for performing the program.

15. The printer of claim 7 wherein the indicia of the program comprises JAVA byte code.

16. A method for integrating a first specification with a second specification, the first specification operative with reference to static data, the integration being operative in an environment, the method comprising:
a. preparing a third specification in accordance with the first specification wherein the third specification comprises a factory specification, the factory for object instantiation, the factory specification comprising factory instance data; and
b. preparing a fourth specification in accordance with the second specification, the fourth specification in operation:
(1) instantiates a factory object in accordance with the factory specification;
(2) requests object instantiation via the factory object; and
(3) is operative with reference to the factory instance data instead of the static data.

17. The method of claim 16 wherein construction in accordance with the factory specification provides a singleton factory object.

18. The method of claim 16 further comprising storing the third specification and the fourth specification in a memory, the memory comprising one package.

19. The method of claim 16 further comprising providing access by a virtual machine to the third specification.

20. The method of claim 19 further comprising providing the third specification in JAVA byte code.

* * * * *